US011118093B2

(12) United States Patent
Amanullah et al.

(10) Patent No.: US 11,118,093 B2
(45) Date of Patent: Sep. 14, 2021

(54) MICRONIZED LOSS PREVENTION MATERIAL (LPM) FOR PREVENTIVE LOSS CONTROL

(71) Applicant: Saudi Arabian Oil Company, Dhahran (SA)

(72) Inventors: Md Amanullah, Dhahran (SA); Turki Al-Subaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 43 days.

(21) Appl. No.: 16/555,299

(22) Filed: Aug. 29, 2019

(65) Prior Publication Data

US 2021/0062063 A1   Mar. 4, 2021

(51) Int. Cl.
| | |
|---|---|
| *C09K 8/035* | (2006.01) |
| *C09K 8/20* | (2006.01) |
| *E21B 21/00* | (2006.01) |
| *C09K 8/28* | (2006.01) |
| *C09K 8/514* | (2006.01) |

(52) U.S. Cl.
CPC .............. *C09K 8/035* (2013.01); *C09K 8/206* (2013.01); *C09K 8/28* (2013.01); *C09K 8/514* (2013.01); *E21B 21/003* (2013.01); *C09K 2208/04* (2013.01)

(58) Field of Classification Search
None
See application file for complete search history.

(56) References Cited

U.S. PATENT DOCUMENTS

| | | | |
|---|---|---|---|
| 3,078,920 | A | 2/1963 | ten Brink |
| 3,448,800 | A | 6/1969 | Parker et al. |
| 3,909,421 | A | 9/1975 | Gaddis |
| 10,240,411 | B1 | 3/2019 | Amanullah |
| 2017/0058180 | A1* | 3/2017 | Hossain ................ C09K 8/516 |

FOREIGN PATENT DOCUMENTS

| | | |
|---|---|---|
| WO | 2018013619 A1 | 1/2018 |
| WO | 2018118833 A1 | 6/2018 |
| WO | 2018222478 A1 | 12/2018 |
| WO | 2019156959 A1 | 8/2019 |

OTHER PUBLICATIONS

International Search Report and Written Opinion for International Application No. PCT/US2020/047761 report dated Nov. 12, 2020; pp. 1-14.

* cited by examiner

*Primary Examiner* — Anuradha Ahuja
(74) *Attorney, Agent, or Firm* — Bracewell LLP; Constance G. Rhebergen; Brian H. Tompkins

(57) ABSTRACT

A micronized date tree particle mix loss prevention material (LPM) is provided. The micronized date tree particle mix LPM includes date palm seed particles produced from date palm seeds and date tree fiber particles produced from date tree waste such as date tree trunks. The date palm seed particles may have a size in the range of 1 micron to less than 150 microns. The date tree waste fiber particles may have a size in the range of 1 micron to less than 250 microns. Methods of loss prevention and manufacture of a micronized date tree particle mix LPM are also provided.

6 Claims, 4 Drawing Sheets

MICRONIZED LOSS PREVENTION MATERIAL (LPM) FOR PREVENTIVE LOSS CONTROL

BACKGROUND

Field of the Disclosure

The present disclosure generally relates to controlling lost circulation in a wellbore during drilling with a drilling fluid. More specifically, embodiments of the disclosure relate to loss prevention materials (LPM) for preventive loss control.

Description of the Related Art

Loss of drilling fluid (which may include or be referred to as "lost circulation") is one of the frequent challenges encountered during drilling operations. As a wellbore is drilled, a drilling fluid is continuously pumped into the wellbore to clear and clean the wellbore and the filings. The drilling fluid is pumped from a mud pit into the wellbore and returns again to the surface. Fluid loss, such as in a lost circulation zone, is encountered when the flow rate of the drilling fluid that returns to the surface is less than the flow rate of the drilling fluid pumped into the wellbore. Such fluid loss may be encountered during any stage of operations. While some fluid loss is expected, excessive fluid loss is not desirable from a safety, an economical, or an environmental point of view. Loss of drilling fluid is associated with problems with well control, borehole instability, pipe sticking, unsuccessful production tests, poor hydrocarbon production after well completion, and formation damage due to plugging of pores and pore throats by mud particles. In extreme cases, fluid loss problems may force abandonment of a well.

Fluid loss can occur in various formations, such as naturally fractured formations, cavernous formations, and highly permeable formations. The extent of the fluid loss and the ability to prevent or control the fluid loss depends on the type of formation in which the fluid loss occurs.

SUMMARY

Two different loss control strategies are used by in the oil and gas industry to combat loss of circulation. These strategies may use various types of loss control materials, such as particulate materials, fibrous materials, flaky materials, and proprietary blends. One strategy to combat loss of circulation is immediate elimination or control of lost circulation by incorporating loss preventing materials in a mud system to cure the loss immediately after its appearance. The second strategy is a corrective measure of loss control that cures the loss after the occurrence of a lost circulation. Selection of proper loss prevention materials (LPMs) or lost circulation materials (LCMs) having the appropriate type of particles, particle size distribution, particle stiffness and flexibility is important for efficient sealing and blocking of the pores, pore throats, permeable channels, and inter-particle gaps in a loss zone. However, the selection of effective materials may be difficult, and materials may not be suitable across different types of formations and loss zones.

An increasing delay in controlling the loss of circulation may increase the complexity of the loss circulation problem and decrease the probability of success in addressing the loss of circulation. Under these circumstances, a partial loss circulation event may transform to a total loss circulation problem due to the time-dependent degradation of a loss zone. Thus, it may be desirable to prevent the loss of circulation immediately after its occurrence rather than curing the loss of circulation with some delay after the occurrence.

Embodiments of the disclosure are directed to a date tree based particle mix to combat loss of circulation immediately after its occurrence, such that fluid loss is prevented or stopped with minimal loss of fluid. The LPM described in the disclosure is compatible with mud systems so that it has no detrimental impact on the mud properties and the drilling operation. The LPM described in the disclosure is non-reactive, easily mixable to the mud and has no detrimental impact on mud rheology, thixotropic behavior, and fluid loss characteristics. Moreover, the LPM described in the disclosure includes a minimum number of concentration and components to avoid any detrimental impact on solids content, mud properties, and drilling operations.

In one embodiment, a method to prevent lost circulation of a drilling fluid in a wellbore in a formation is provided. The method includes introducing an altered drilling fluid into the wellbore while drilling such that a loss prevention material (LPM) contacts a loss zone. The altered drilling fluid includes the drilling fluid and the LPM. The LPM consists of a first plurality of particles produced from date tree seeds, such that each of the first plurality of particles produced from date tree seeds has a diameter in the range of 1 micron to less than 150 microns, and a second plurality of particles produced from date tree trunks, such that each of the first plurality of particles produced from date tree trunks has a diameter in the range of 1 micron to less than 150 microns.

In some embodiments, the altered drilling fluid consists of the drilling fluid and the LPM. In some embodiments, the drilling fluid is a water-based drilling mud or an oil-based drilling mud. In some embodiments, the first plurality of particles has a concentration of 4 pounds-per-barrel (ppb) in the altered drilling fluid and the second plurality of particles has a concentration of 4 ppb in the altered drilling fluid. In some embodiments, the first plurality of particles is a plurality of untreated particles produced from untreated date tree seeds. In some embodiments, the second plurality of particles is a plurality of untreated particles produced from untreated date tree trunks. In some embodiments, the formation is an unconsolidated formation. In some embodiments, the formation is a formation having a permeability in the range of 50 Darcys to 100 Darcys.

In another embodiment, an altered drilling fluid is provided. The altered drilling fluid includes a drilling fluid and a loss prevention material (LPM). The LPM consists of a first plurality of particles produced from date tree seeds, such that each of the first plurality of particles produced from date tree seeds has a diameter in the range of 1 micron to less than 150 microns, and a second plurality of particles produced from date tree trunks, such that each of the first plurality of particles produced from date tree trunks has a diameter in the range of 1 micron to less than 150 microns.

In some embodiments, the altered drilling fluid consists of the drilling fluid and the LPM. In some embodiments, the drilling fluid is a water-based drilling mud or an oil-based drilling mud. In some embodiments, the first plurality of particles has a concentration of 4 pounds-per-barrel (ppb) in the altered drilling fluid and the second plurality of particles has a concentration of 4 ppb in the altered drilling fluid. In some embodiments, the first plurality of particles is a plurality of untreated particles produced from untreated date tree seeds. In some embodiments, the second plurality of particles is a plurality of untreated particles produced from untreated date tree trunks.

In another embodiment, a loss prevention material (LPM) composition is provided. The LPM composition consists of a first plurality of particles produced from date tree seeds, such that each of the first plurality of particles produced from date tree seeds has a diameter in the range of 1 micron to less than 150 microns, and a second plurality of particles produced from date tree trunks, such that each of the first plurality of particles produced from date tree trunks has a diameter in the range of 1 micron to less than 150 microns. In some embodiments, the first plurality of particles is a plurality of untreated particles produced from untreated date tree seeds. In some embodiments, the second plurality of particles is a plurality of untreated particles produced from untreated date tree trunks.

In another embodiment, a method of forming a loss prevention material (LPM) is provided. The method includes processing date tree seeds to produce a first plurality of particles, such that each of the first plurality of particles produced from date tree seeds has a diameter in the range of 1 micron to less than 150 microns, and processing date tree trunks to produce a second plurality of particles, such that each of the first plurality of particles produced from date tree trunks has a diameter in the range of 1 micron to less than 150 microns. The method further includes mixing a first amount of the first plurality of particles and a second amount of the second plurality of particles to form the LPM. In some embodiments, processing the date tree seeds to produce the first plurality of particles includes grinding the date tree seeds. In some embodiments, processing the date tree trunks to produce the second plurality of particles includes grinding the date tree trunks.

DETAILED DESCRIPTION

Figure 1:
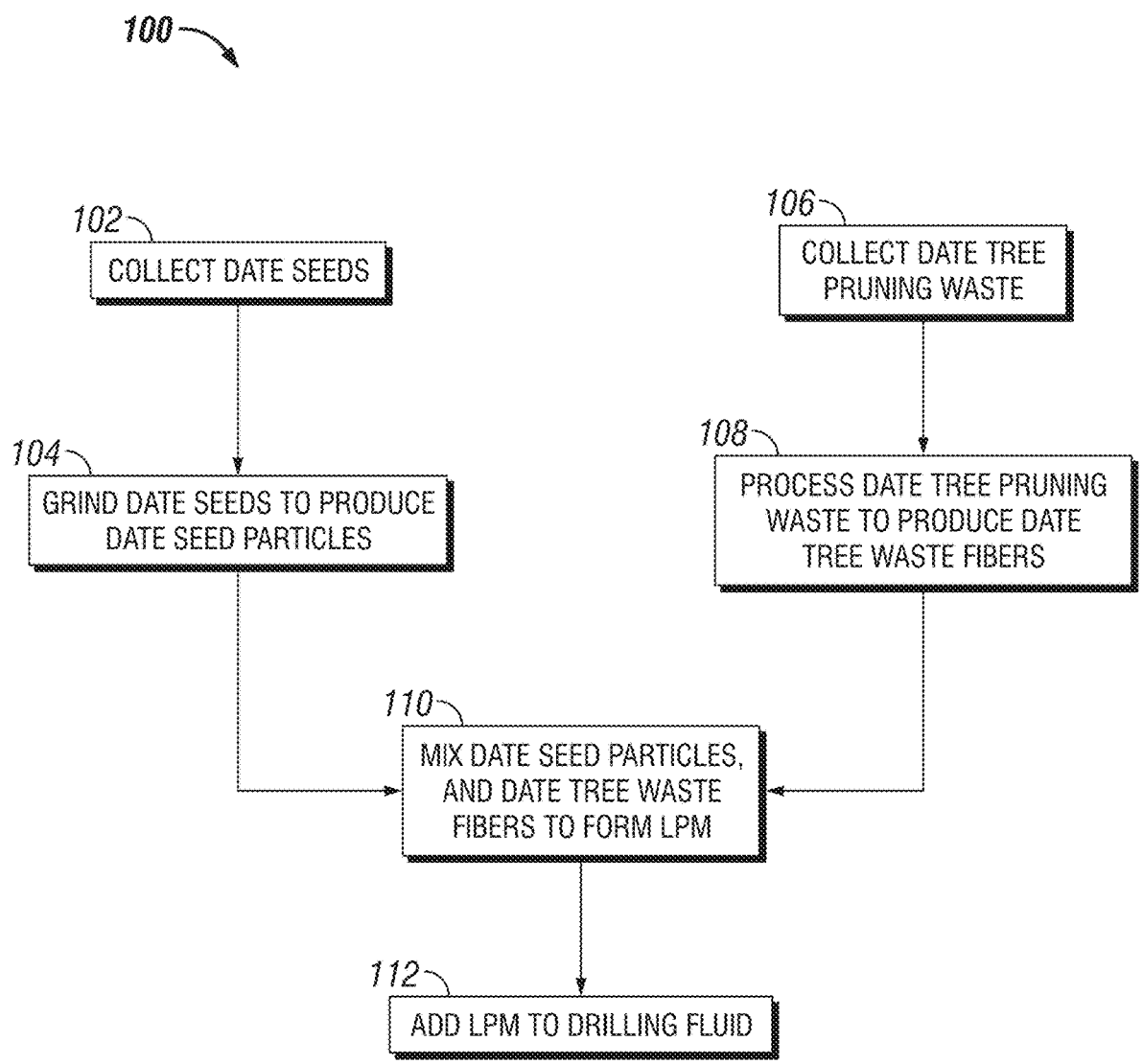
FIG. 1 is a process for the production and use of a micronized date tree particle mix LPM formed from date palm seed particles and date tree waste in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include an LPM (referred to as a "micronized date tree particle mix" LPM) that includes a mix of date palm seed particles obtained from date palm seeds and date tree fiber particles obtained from fibrous date tree parts (such as date tree waste from date production or date tree pruning). As used in the disclosure, the term date palm seeds refers to the seeds produced from date trees (also referred to as "date palms"), such as used in the production of date fruits (also referred to as "dates"). The micronized date tree particle mix LPM may mitigate or prevent fluid loss (that is, loss of drilling fluid) during drilling of a well. In some embodiments, the micronized date tree particle mix may be used as a lost circulation material (LCM) to cure fluid loss after it occurs in a lost circulation zone.

The date tree seeds and fibrous date tree parts are obtained from the species phoenix dactylifera. It should be appreciated that, in some embodiments, the date tree seeds and date tree waste may be obtained from genetically modified date trees (that is, genetically modified organisms (GMOs)).

The date tree product LCM includes date tree seed particles formed from ground date tree seeds. The date tree seed particles have a size (for example, diameter) of less than 150 microns (μm). In some embodiments, the date tree seed particles have a size (for example, diameter) in the range of 1 micron to 150 microns. In some embodiments, the date seed particles may have the particle size distribution (as determined by the diameters of the particles passed or retained in mesh openings) shown in Table 1:

TABLE 1

PARTICLE SIZE DISTRIBUTION OF DATE SEED PARTICLES

| Sieve Mesh No. | Size (in microns) | Typical Percentage | Average Percentage |
|---|---|---|---|
| 100 | 150 | 100% Passed | 100% Passed |
| 200 | 74 | 20-40% Retained | 30 ± 10% Retained |
| 325 | 44 | 20-40% Retained | 30 ± 10% Retained |
| Pan | <44 | 30-50% Retained | 40 ± 10% Retained |

The date tree seed particles have a dry density near that of water, are free from any settlement action in a mud system, and are able to enter into weak rock fabric (that is, the structure and texture of the rock) under the overbalance pressure to enhance the mechanical stability of the rock fabric and formed structures.

The date tree product LCM pill includes date tree fiber particles (that is, particles formed from fibrous date tree parts, such as date tree waste from date production or date tree pruning). In some embodiments, the date tree parts are date tree trunks, such that the date tree fiber particles are date tree trunk fiber particles. The date tree fiber particles have a size (for example, length) of less than 250 microns. In some embodiments, the date tree fiber particles have a size (for example, diameter) in the range of 1 micron to 250 microns. In some embodiments, the date tree fiber particles may have the particle size distribution (as determined by the diameters of the particles passed or retained in mesh openings) shown in Table 2:

TABLE 2

SIZE DISTRIBUTION OF DATE TREE FIBER PARTICLES

| Sieve Mesh No. | Size (in microns) | Typical Percentage | Average Percentage |
|---|---|---|---|
| 100 | >150 (cut point < 250 microns) | 2-10% Retained | 6 ± 4% Retained |
| 150 | 105-150 | 6-16% Retained | 11 ± 5% Retained |

TABLE 2-continued

SIZE DISTRIBUTION OF DATE TREE FIBER PARTICLES

| Sieve Mesh No. | Size (in microns) | Typical Percentage | Average Percentage |
|---|---|---|---|
| 270 | 53-105 | 50-76% Retained | 63 ± 13% Retained |
| Pan | <53 | 10-30% Retained | 20 ± 10% Retained |

The date seed fiber particles have a dry density less than water, are free from any settlement action in a mud system, and are able to enter into rigid rock fabric easily due to the adaptable nature of the particles under the overbalance pressure resulting in size and shape adaptation.

In some embodiments, the date palm seeds may include untreated date palm seeds and the date tree parts (including date tree waste) may include untreated date tree parts. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the particles. In such embodiments, the date palm seed particles and date tree waste may be manufactured without treating before, during, or after crushing, grinding, drying, or any other processing.

The presence of two types of components having the sizes described in the disclosure may enable the micronized date tree particle mix LPM to reduce or prevent partial loss of circulation immediately after contact with a loss zone while drilling a highly permeable or unconsolidated formation. As used in the disclosure, the term "highly permeable" refers to a formation having a permeability in the range of 50 to 100 Darcys. The LPM may be mixed "on-the-fly" in a mud system to avoid any pre-hydration or other mixing-related delay prior to addition to a drilling mud and enable homogenous distribution of the LPM in the mud system. The LPM may be mixed in the mud system using conventional mud mixing tools and equipment typically available at a wellsite and without any additional tools or mixing equipment. Advantageously, the use of only two components in the LPM minimizes any detrimental impact on or reaction with a drilling mud or mud components. Further, the components of the LPM have a density close or less than the fluid phase of drilling muds, thus preventing significant alternation of the drilling mud density and avoiding settling, precipitation, and sagging in the drilling mud circulation system.

The micronized date tree particle mix LPM may form a structure (for example, a seal or plug) in loss zones in highly permeable or unconsolidated formations to prevent or minimize the partial loss of circulation. The LPM may be capable of forming seals or plugs in fractures or other openings having a size in the range of 2 millimeters (mm) to 10 mm. The LPM may prevent the loss of whole mud in such loss zones. The combination of the two types of components may be particularly effective in highly permeable or unconsolidated formations as compared to existing LCMs and LPMs.

FIG. 1 depicts a process 100 for the production and use of LPM in accordance with an example embodiment of the disclosure. As shown in FIG. 1, date tree seeds may be collected (block 102), such as from date tree waste produced by date tree farming and date processing industries. In some embodiments the date palm seeds may be cleaned, such as by a pressurized water or air jet, to remove dirt, dust, and other foreign substances. The collected date palm seeds may be ground to produce particles from the date palm seeds (block 104). In some embodiments, the collected date palm seeds may be ground using a suitable commercial grinder that produces a specific range of particle sizes (for example, diameter).

Additionally, date tree waste may be collected (block 106), such as from waste produced by pruning in date tree farming or from date processing. The date tree waste may include date tree trunks. In some embodiments, the date tree waste may include other components of the date tree, such as date tree rachis. In some embodiments the date tree waste (such as trunks) may be cleaned, such as by a pressurized water or air jet, to remove dirt, dust, and other foreign substances. The collected date tree waste may be chopped, ground, or otherwise processed to produce fiber particles from the date tree waste (block 108). For example, the date tree fiber particles may include particles formed from date tree rachis, date tree trunks, or a combination thereof. In some embodiments, the collected date tree waste may be ground using a suitable commercial grinder that produces a specific range of particle sizes (for example, diameter).

The date palm seed particles and date tree fiber particles may then be mixed to form a LPM (block 110). In some embodiments, the mix of date palm seed particles and date tree pruning waste particles may be packed for transportation and use. In some embodiments, a suitable amount of packed mix may then be transported to an oil and gas operations site for use as an LPM.

The micronized date tree particle mix LPM may be added directly to a drilling fluid (block 112), such as a drilling mud, to create an altered drilling fluid having the micronized date tree particle mix LPM. For example, in some embodiments, the micronized date tree particle mix LPM may be added to (for example, blended with) an oil-based drilling mud or a water-based drilling mud. In some embodiments, the drilling mud includes a viscosifier. In some embodiments, the water-based drilling mud may include saltwater. In some embodiments, the drilling mud is a bentonite mud that includes water, bentonite mud, caustic soda, and soda ash. In some embodiments, the micronized date tree particle mix LPM may be added at the mud pit of a mud system.

After addition of the micronized date tree particle mix LPM to a drilling fluid, drilling operations may begin or resume by using the altered drilling fluid with the micronized date tree particle mix LPM during drilling. For example, while a well is drilled and drilling fluid is circulated downhole in the wellbore, the micronized date tree particle mix LPM may prevent fluid loss through porous and permeable paths, cracks, and fractures in a formation accessed by the wellbore. As discussed supra, the LPM may be effective in highly permeable or unconsolidated formations. The LPM in the drilling fluid may form structures (for example, a plug or seal) in the paths, cracks, and fractures or openings thereof to prevent loss of the drilling fluid during drilling operations. The LPM may be capable of forming seals or plugs in fractures or other openings having a size in the range of 2 mm to 10 mm. In some embodiments, the micronized date tree particle mix LPM may prevent the loss of any drilling fluid during drilling (such that the rate of fluid loss is equal to zero). Advantageously, the micronized date tree particle mix LPM may prevent the loss of drilling fluid in loss zones before the occurrence of any fluid loss. In some embodiments, the micronized date tree particle mix LPM may consist of the date palm seed particles and date tree pruning waste particles without any other fluid loss additives, activators, or other components. In other embodiments, the micronized date tree particle mix LPM may be combined with other fluid loss additive and then may be added to a drilling fluid, such as a drilling mud, to create an altered drilling fluid having the LPM and other fluid loss additives.

In some embodiments, the micronized date tree particle mix may be used as a lost circulation material (LCM) to mitigate or stop lost circulation in lost circulation zones. In such embodiments, the micronized date tree particle mix LPM may be added directly to a drilling fluid, such as a drilling mud, to create an altered drilling fluid having the micronized date tree particle mix LPM. After addition of the micronized date tree particle mix LPM to a drilling fluid, the altered drilling fluid may be circulated at a pump rate effective to position the altered drilling fluid into contact with a lost circulation zone in a wellbore, such that the micronized date tree particle mix LPM alters the lost circulation zone (for example, by entering and blocking porous and permeable paths, cracks, and fractures in a formation in the lost circulation zone, such as forming a structure (for example, a plug or seal) in a mouth or within a fracture). In some embodiments, the hybrid particle mix LCM may be mixed with a carrier fluid, a viscosifier, or both. In some embodiments, a micronized date tree particle mix LPM homogenous suspension or fluid pill may be formed. For example, a specific carrier fluid, viscosifier, or combination thereof may be selected to form a homogenous suspension or fluid pill with the micronized date tree particle mix LPM. The homogenous suspension or pill may be added to a drilling fluid and used in the manner similar to the micronized date tree particle mix LPM described in the disclosure.

Examples

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a micronized date tree particle mix LPM were prepared and tested using a 65 pounds per cubic foot (pcf) bentonite mud. Additionally, non-limiting examples of a micronized date tree particle mix LPM were prepared and evaluated against a multi-component commercial LCM. The composition of the 65 pcf bentonite mud is shown in Table 3:

TABLE 3

COMPOSITION OF 65 PCF BENTONITE MUD

| Mud Component | Field Formulation (pounds-per-barrel (ppb)) | Lab Formulation (cubic centimeters (cc) or grams (gm)) |
|---|---|---|
| Freshwater | 0.97 | 339.8 cc |
| Bentonite | 25 | 25 gm |
| Caustic Soda (NaOH) | 0.5 | 0.5 gm |
| Soda Ash (Na$_2$CO$_3$) | 0.5 | 0.5 gm |

The micronized date tree particle mix LPM was prepared by combining 4 pounds-per-barrel (ppb) of date tree seeds and 4 ppb date tree fiber particles in 350 cc of the bentonite mud. The date tree seed particles had a size (diameter) of less than 150 microns. The date tree fiber particles had a size (length) of less than 250 microns.

The particle size distribution (as determined by the diameters of the particles passed or retained in mesh openings) of the date tree seed particles in the example micronized date tree particle mix LPM is shown in Table 4:

TABLE 4

PARTICLE SIZE DISTRIBUTION OF DATE TREE SEED PARTICLES

| Sieve Mesh No. | Size (in microns) | Typical Percentage | Average Percentage |
|---|---|---|---|
| 100 | 150 | 100% Passed | 100% Passed |
| 200 | 74 | 20-40% Retained | 30 ± 10% Retained |
| 325 | 44 | 20-40% Retained | 30 ± 10% Retained |
| Pan | <44 | 30-50% Retained | 40 ± 10% Retained |

The particle size distribution (as determined by the diameters of the particles passed or retained in mesh openings) of the date tree fiber particles in the example micronized date tree particle mix LPM is shown in Table 5:

TABLE 5

SIZE DISTRIBUTION OF DATE TREE FIBER PARTICLES

| Sieve Mesh No. | Size (in microns) | Typical Percentage | Average Percentage |
|---|---|---|---|
| 100 | >150 (cut point < 250 microns) | 2-10% Retained | 6 ± 4% Retained |
| 150 | 105-150 | 6-16% Retained | 11 ± 5% Retained |
| 270 | 53-105 | 50-76% Retained | 63 ± 13% Retained |
| Pan | <53 | 10-30% Retained | 20 ± 10% Retained |

The example date product LCM pill was evaluated using a physical simulation of a loss circulation event in a partial loss zone. An unconsolidated sand bed of 20/40 sand (that is, sand having a sieve cut of 20/40 such that the sand particles have a size range of about 0.841 mm to about 0.420 mm) was used for physical simulation of a partial loss zone using a see-through test cell and associated fixtures.

An initial test of the simulated partial loss zone was performed using the bentonite mud. 350 cc of bentonite mud was placed on top of the sand bed using a placement device to prevent any damage and degradation of the sand bed. After mounting the see-through test cell in the test frame, a 100 pounds per square inch (psi) pressure was applied to the top of the test cell (that is, on top of the bentonite mud) to simulate a typical overbalance pressure in a wellbore. Immediately after the application of the 100 psi overbalance pressure, all of the bentonite mud was lost by its escaping through the sand bed matrix and via the exit hole and transparent tube connected to the test cell. The simulation demonstrated that bentonite mud will be lost in a borehole environment in an unconsolidated and highly permeable loss zone.

Figure 2B:
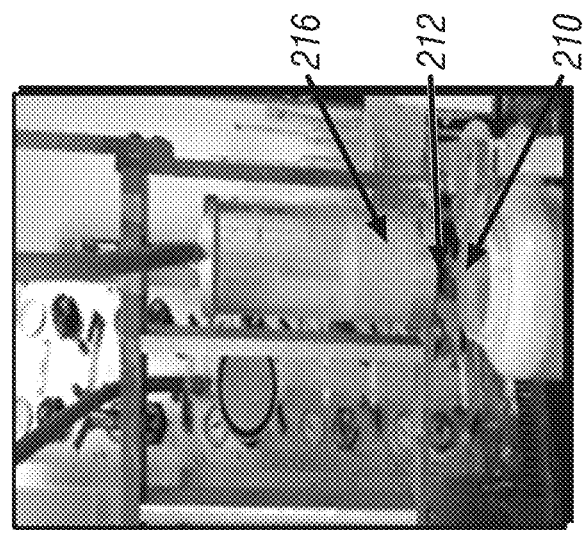
FIGS. 2A and 2B are photographs of a see-through test cell in a test frame and bentonite mud before and after the application of an over pressure in accordance with embodiments of the disclosure.
Figure 2A:
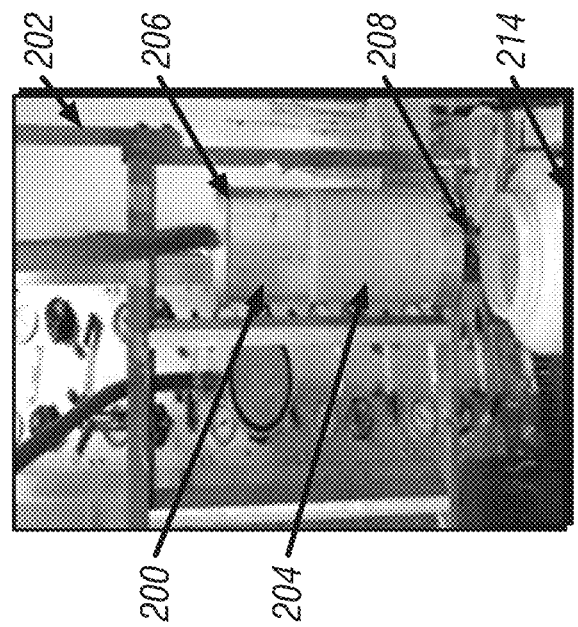

FIGS. 2A and 2B are photographs of the see-through test cell 200 in a test frame 202 with the bentonite mud 204 before and after the application of the 100 psi pressure in accordance with an embodiment of the disclosure. The see-through test cell 200 depicted in FIGS. 2A and 2B includes a top lid 206, a bottom lid 208 and a transparent exit pipe 210 connected to a 10 millimeter (mm) exit hole 212 and directed to a collection pot 214.

FIG. 2A is a photograph of the test cell 200 before application of the 100 psi overbalance pressure. As shown in the photograph, the bentonite mud 204 is disposed on top of the sand bed 216.

FIG. 2B is a photograph showing the test cell 200 after application of the 100 psi overbalance pressure. As shown in FIG. 2B, no bentonite mud is visible in the test cell 200, as all of bentonite mud exited the test cell 200 into the collection pot 214 via the transparent exit pipe 210. The test results for the bentonite mud in the simulated partial loss zone are shown in Table 6:

TABLE 6

TEST DATA FOR BENTONITE MUD

| Applied Pressure | Measured Parameters | Value Based on 20/40 Sand Bed |
|---|---|---|
| 100 psi | Spurt Loss (cc) | 0 |
| | Mud loss (cc) | |
| | Total Leaf Off (cc) | |
| | Seal/Plug Thickness | 6-8 mm |
| | Slurry Level Drop | 12 mm |
| | Invasion Depth | 20 mm |

Next, the loss prevention performance of the example micronized date tree particle mix LPM was tested using the simulated partial loss zone. As mentioned supra, 4 ppb of date tree seeds and 4 ppb date tree fiber particles were combined in the bentonite mud to form a slurry, such that 8 pounds-per-barrel (ppb) of the example micronized date tree particle mix LPM was incorporated into the bentonite mud and mixed homogenously using a high speed mixer.

Figure 3B:
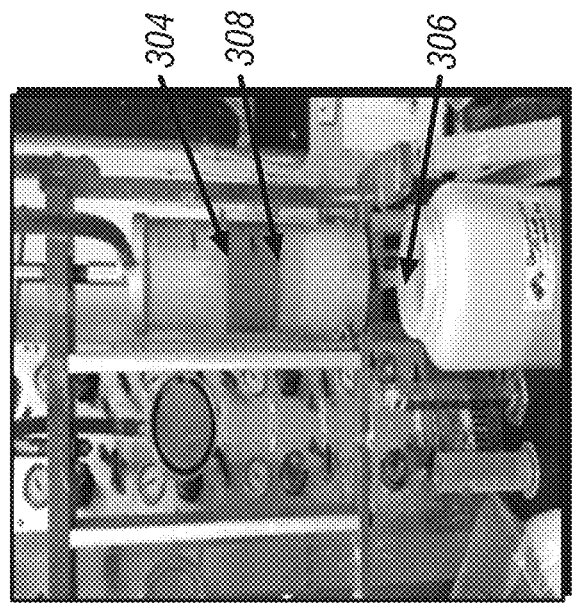
FIGS. 3A and 3B are photographs of a see-through test cell in a test frame and micronized date tree component LPM before and after the application of pressure in accordance with embodiments of the disclosure.
Figure 3A:
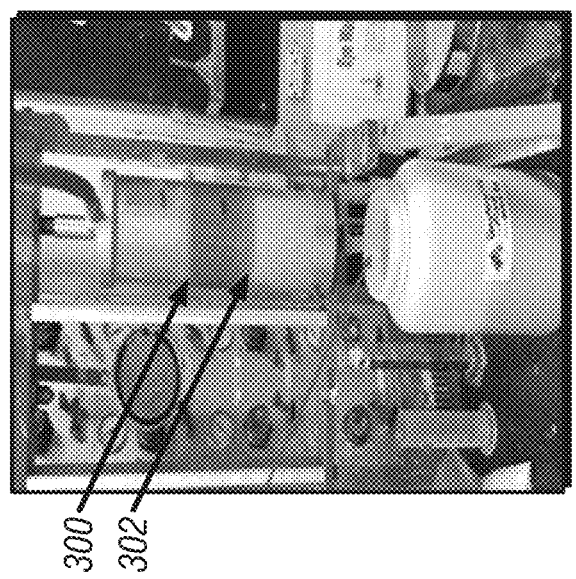

FIGS. 3A and 3B are photographs of the see-through test cell and the micronized date tree particle mix LPM before and after the application of the 100 psi pressure in accordance with an embodiment of the disclosure. FIG. 3A is a photograph of the micronized date tree particle mix LPM, the height of the slurry (indicated by arrow 300), and the interface between the micronized date tree particle mix LPM and the sand bed (indicated by arrow 302) without any indication of cake formation before the application of the 100 psi pressure.

FIG. 3B is a photograph showing the test cell 200 after application of the 100 psi overbalance pressure. FIG. 3B shows depicts a slight drop in the level of the micronized date tree particle mix LPM slurry due to some leakage of the micronized date tree particle mix LPM slurry into the sand bed matrix after application of the 100 psi pressure. After an initial drop (about 15 mm-18 mm) in the level (indicated by arrow 304) of the micronized date tree particle mix LPM slurry, no whole mud escaped through the exit hole of the test cell. As also shown in FIG. 3B, the fluid (indicated by arrow 306) exiting the test cell remained clear indicated no loss of whole mud. The initial drop in the mud level before complete cessation of the slurry movement through the sand bed matrix allowed for the deposition of a thin cake (indicated by arrow 308) on top of the test bed.

The test results for the micronized date tree particle mix LPM in the simulated partial loss zone are shown in Table 7:

TABLE 7

TEST DATA FOR MICRONIZED DATE TREE PARTICLE MIX LPM

| Applied Pressure | Measured Parameters | Value Based on 20/40 Sand Bed |
|---|---|---|
| 100 psi | Spurt Loss (cc) | 0 |
| | Mud loss (cc) | |
| | Total Leaf Off (cc) | |
| | Seal/Plug Thickness | 7-8 mm |
| | Slurry Level Drop | 15-18 mm |
| | Invasion Depth | 20-25 mm |
| | Sand Bed Length (mm) | 105 mm |

As shown in Table 7, the testing resulted in only a partial invasion of about 20 mm to 25 mm of the sand bed due to some leakage of the micronized date tree particle mix LPM slurry into the sand bed matrix, illustrating the preventive loss control ability of the micronized date tree particle mix LPM. The invasion depth of 20 mm to 25 mm is significantly less than the length of the sand bed (about 105 mm), demonstrating the efficient and rapid sealing and blocking of the sand bed matrix by the micronized date tree particle mix LPM. The invasion depth of less than 25% of the length of the sand bed illustrates an ability of the micronized date tree particle mix LPM to quickly prevent the loss of mud in potential loss zones in highly permeable and unconsolidated formations.

As also shown in Table 7, a thin cake of about 15 mm to 18 mm formed on the sand bed. The formation of the thin cake is another advantageous property of the micronized date tree particle mix LPM. For example, the formation of a thin cake on the face of a loss zone may decrease the likelihood of pipe sticking, thus improving the economics of a drilling operation by reducing non-productive time (NPT) and the total drilling cost.

Additionally, the fluid loss performance of a conventional multi-component LCM pill was tested using the simulated partial loss zone. The composition of the conventional multicomponent LCM pill is shown in Table 8, with the median particle size in microns and the concentration in pounds-per-barrel (ppb):

TABLE 8

COMPOSITION OF CONVENTIONAL MULTICOMPONENT LCM PILL

| Component | Median Particle Size (D50 Particle size distribution) (in microns) | Concentration (in ppb) |
|---|---|---|
| Nut Plug ® | 1200-1500 | 15 |
| Sure-Seal ™ | 400-600 | 10 |
| Barofiber ® C | 1200-1400 | 10 |
| Marble particles (coarse) | 600 | 15 |
| Marble particles (medium) | 150 | 20 |
| Baracarb ®-50 | 50 | 10 |
| Soluflake ™ M | 850 | 15 |
| Sunsweep ® | | 0.2 |
| Total Pill Concentration | | 95.2 |
| Carrier Fluid | | Bentonite Mud |

As shown in Table 8, the conventional multicomponent LCM pill includes the following commercially available components: Nut Plug® manufactured by M-I SWACO of Houston, Tex., USA; Barofiber® Coarse (C) manufactured by Halliburton Company of Houston, Tex., USA; Sure-Seal™ manufactured by Drilling Specialties Company of The Woodlands, Tex., USA; Baracarb®-50 manufactured by Halliburton Company of Houston, Tex., USA; Soluflake™-M manufactured by Baker Hughes of Houston, Tex., USA; and Sunsweep® manufactured by Sun Drilling Products Corp. of Belle Chasse, La., USA.

Figure 4B:
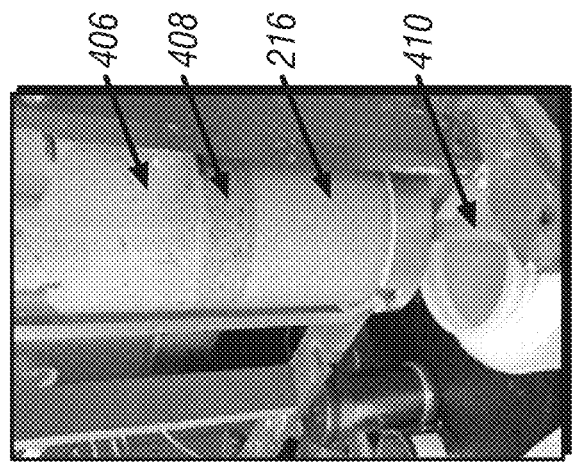
FIGS. 4A and 4B are photographs of a see-through test cell in a test frame and conventional multicomponent LCM pill before and after the application of pressure in accordance with embodiments of the disclosure.
Figure 4A:
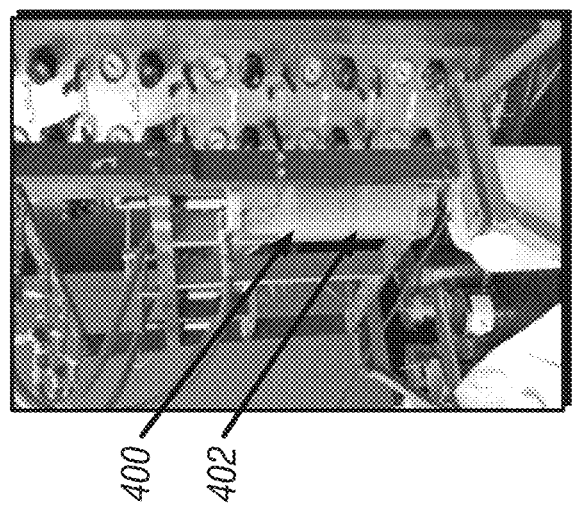

The conventional multi-component LCM pill was incorporated in 350 cc of the bentonite mud according to the amounts listed in Table 8. FIGS. 4A and 4B are photographs of the see-through test cell and the conventional multicomponent LCM pill before and after the application of the 100 psi pressure in accordance with an embodiment of the disclosure. FIG. 4A is a photograph of the conventional multicomponent LCM pill slurry, the height of the slurry (indicated by arrow 400), and the interface between the conventional multicomponent LCM pill slurry and the sand bed (indicated by arrow 402) without any indication of cake formation before the application of the 100 psi pressure. FIG. 4A also shows the absence of any cloudy fluid before the application of the 100 psi pressure.

FIG. 4B is a photograph depicting a total drop in the level of the conventional multicomponent LCM pill slurry and a complete loss of the conventional multicomponent LCM pill slurry through the sand bed matrix. As indicated by arrow 406 in FIG. 4B, after the application of the 100 psi overbalance pressure there was no conventional multicomponent LCM pill slurry present in the test cell above the sand bed 216 (that is, the sand bed was completely invaded by the conventional multicomponent LCM pill slurry).

The filtering of the conventional multicomponent LCM pill slurry allowed for the deposition of a thick cake (indicated by arrow 408) on the top of the sand bed after the application of the 100 psi overbalance pressure. The length of the sand bed darkened due to the infiltration of the conventional multicomponent LCM pill slurry with the bentonite mud. Additionally, the transparent pipe connection to the exit hole became very cloudy (as indicated by arrow 410) due to entry of the bentonite mud. The observations during the test indicated the inability of the conventional multicomponent LCM pill to prevent partial loss of circulation.

The test results for the micronized date tree particle mix LPM in the simulated partial loss zone are shown in Table 9:

TABLE 9

TEST DATA FOR CONVENTIONAL MULTICOMPONENT LCM PILL

| Applied Pressure (psi) | Measured Parameters | Value Based on 20/40 Sand Bed |
|---|---|---|
| 100 | Spurt Loss (cc) Mud loss (cc) Total Leaf Off (cc) Seal/Plug Thickness Slurry Level Drop Invasion Depth | All 350 cc Slurry Lost 55-65 mm Total Below the Sand Bed Height |

The test data shown in Table 9 shows a total leakage of the conventional multicomponent LCM pill slurry within the time period of the test. The test data also shows the deposition of a thick cake having a thickness in the range of 55 mm to 65 mm on the sand bed. The formation of a thick cake during drilling operations may increase the likelihood of pipe sticking, thus creating a problem that increases non-productive time (NPT) and total drilling cost. Additionally, the test data also showed an invasion depth below the height of the sand bed that further demonstrated the inability of the conventional multicomponent LCM pill to prevent or control partial loss of circulation.

Ranges may be expressed in the disclosure as from about one particular value to about another particular value or both. When such a range is expressed, it is to be understood that another embodiment is from the one particular value to the other particular value or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to prevent lost circulation of a drilling fluid in a wellbore in a formation, comprising:
introducing an altered drilling fluid into the wellbore while drilling such that a loss prevention material (LPM) contacts a loss zone and thereby prevents lost circulation of the drilling fluid, wherein the altered drilling fluid comprises the drilling fluid and the LPM, wherein the LPM consists of:
a first plurality of particles produced from date tree seeds, wherein each of the first plurality of particles produced from date tree seeds has a diameter in the range of 1 micron to less than 150 microns; and
a second plurality of particles produced from date tree trunks, wherein each of the second plurality of particles produced from date tree trunks has a diameter in the range of 1 micron to less than 150 microns.

2. The method of claim 1, wherein the altered drilling fluid consists of the drilling fluid and the LPM.

3. The method of claim 1, wherein the drilling fluid comprises a water-based drilling mud or an oil-based drilling mud.

4. The method of claim 1, wherein the first plurality of particles has a concentration of 4 pounds-per-barrel (ppb) in the altered drilling fluid and the second plurality of particles has a concentration of 4 ppb in the altered drilling fluid.

5. The method of claim 1, wherein the formation comprises an unconsolidated formation.

6. The method of claim 1, wherein the formation comprises a formation having a permeability in the range of 50 Darcys to 100 Darcys.

* * * * *